United States Patent [19]

Cocklin et al.

[11] Patent Number: 5,309,509
[45] Date of Patent: May 3, 1994

[54] GRAPHICAL USER INTERFACE WORKSTATION

[75] Inventors: Sherri L. Cocklin, Englishtown; Thomas P. Orlofsky, Lincroft, both of N.J.; Tanya T. van der Heyde, Reynoldsburg, Ohio

[73] Assignee: AT&T Bell Laboratories, Murray Hill, N.J.

[21] Appl. No.: 920,089

[22] Filed: Jul. 27, 1992

[51] Int. Cl.$^5$ ............... H04M 17/00; H04M 3/42
[52] U.S. Cl. ................... 379/165; 379/156; 379/157; 379/201; 379/207
[58] Field of Search ............ 379/156, 157, 165, 166, 379/94, 112, 113, 201, 207, 354, 355

[56] References Cited

U.S. PATENT DOCUMENTS

| | | | |
|---|---|---|---|
| 4,431,870 | 2/1984 | May et al. | 379/356 |
| 4,605,825 | 8/1986 | Komuro et al. | 379/165 |
| 4,747,127 | 5/1988 | Hansen et al. | 379/201 |
| 4,763,353 | 8/1988 | Canale et al. | 379/157 |
| 4,782,517 | 11/1988 | Bernardis et al. | 379/287 |
| 4,897,866 | 1/1990 | Majmader et al. | 379/201 |
| 4,905,274 | 2/1990 | Cooper et al. | 379/157 |
| 5,027,391 | 6/1991 | O'Neill et al. | 379/157 |
| 5,048,080 | 9/1991 | Bell et al. | 379/165 |
| 5,062,103 | 10/1991 | Davidson et al. | 379/94 |
| 5,062,133 | 10/1991 | Melrose | 379/201 |
| 5,195,086 | 3/1993 | Baumgestney et al. | 379/202 |

OTHER PUBLICATIONS

"Screen-Based Telephony" by Bob McNinch, IEEE, Apr. 1990.
"Telecommunication Management Networks" by Beyltjens et al., 379/ 941, 1989, pp. 356–365, Electrical Comm. vol. 63, No. 4.
"GA Service Management System for Intelligent System" by Fredrik Ljungblom, Erricsson Review No. 1, 1990, 379/112, 207,94.
"Meridian SL Information Services" Lee et al. Telesis 1985.

Primary Examiner—Stephen Chin
Assistant Examiner—Vijay Shankar
Attorney, Agent, or Firm—Dwight A. Marshall; Charles L. Warren

[57] ABSTRACT

A graphical user interface workstation for use with a manager controller to control and implement changes to telephone sets of customer key telephone systems served by a telephone switching system. The workstation records high resolution graphical representations of each telephone set of a customer key telephone system and enables a customer user to select and display a recorded high resolution graphical representation of each telephone set of the customer user key telephone system. The workstation is interactive with the customer user and enables the customer user to selectively enter telephone lines, features and directory numbers changes into key button locations of a displayed telephone set graphical representation. User entered key button changes are converted into program instructions and transmitted to the manager controller to control the telephone switching system to assign the selected key button telephone lines, features and directory numbers entered onto the displayed key telephone set representations to corresponding telephone sets of the customer key telephone system.

23 Claims, 7 Drawing Sheets

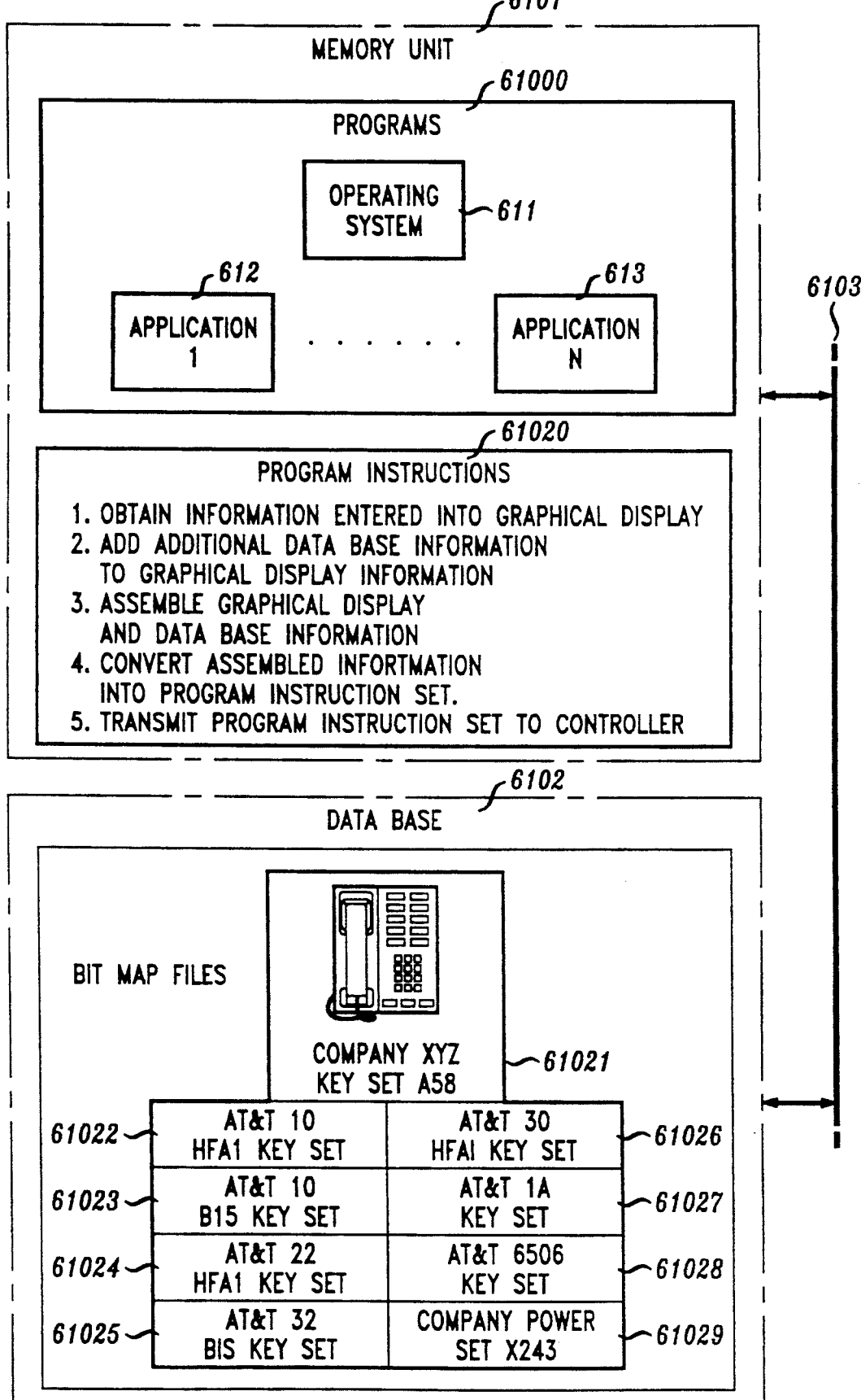

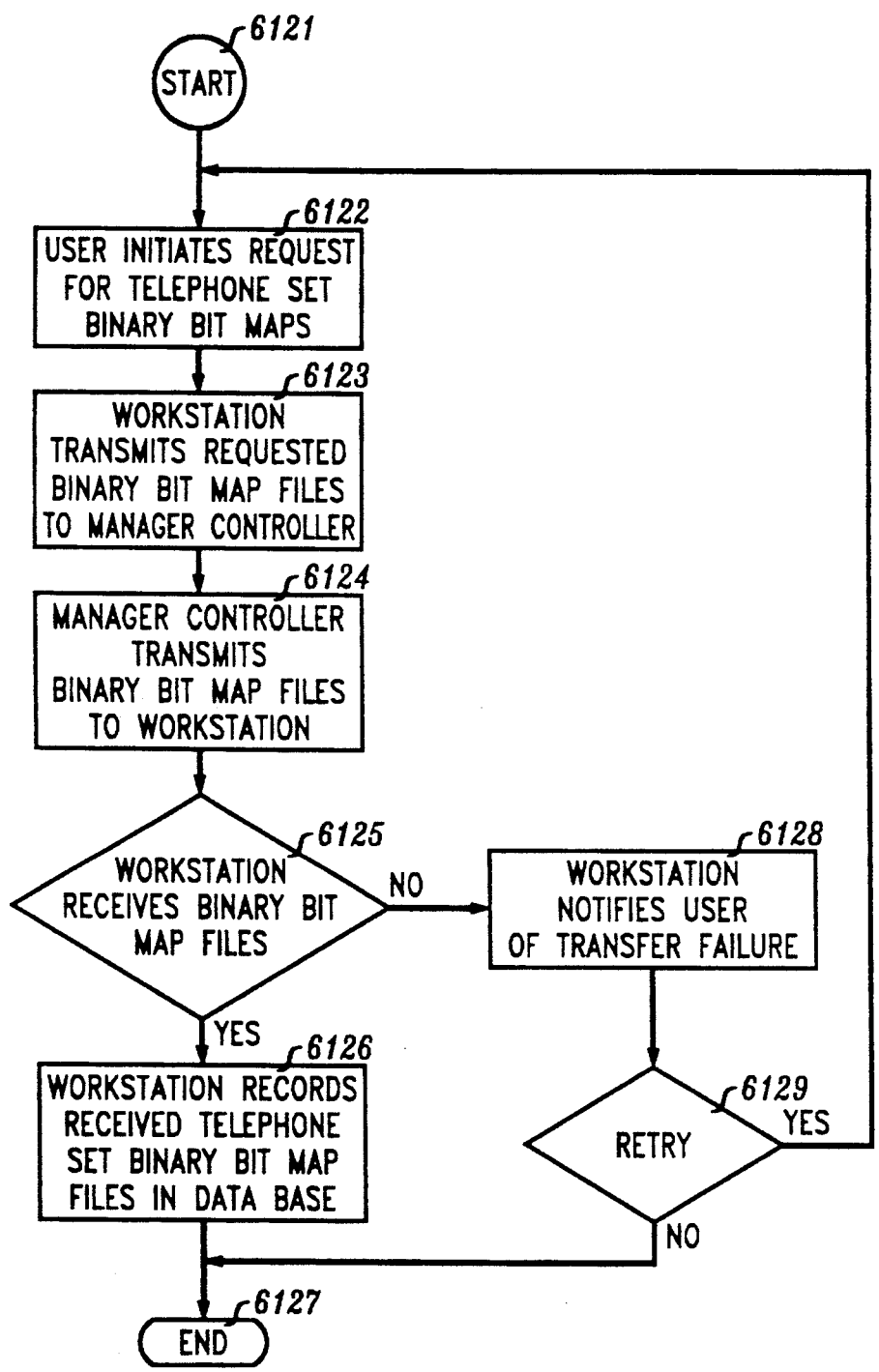

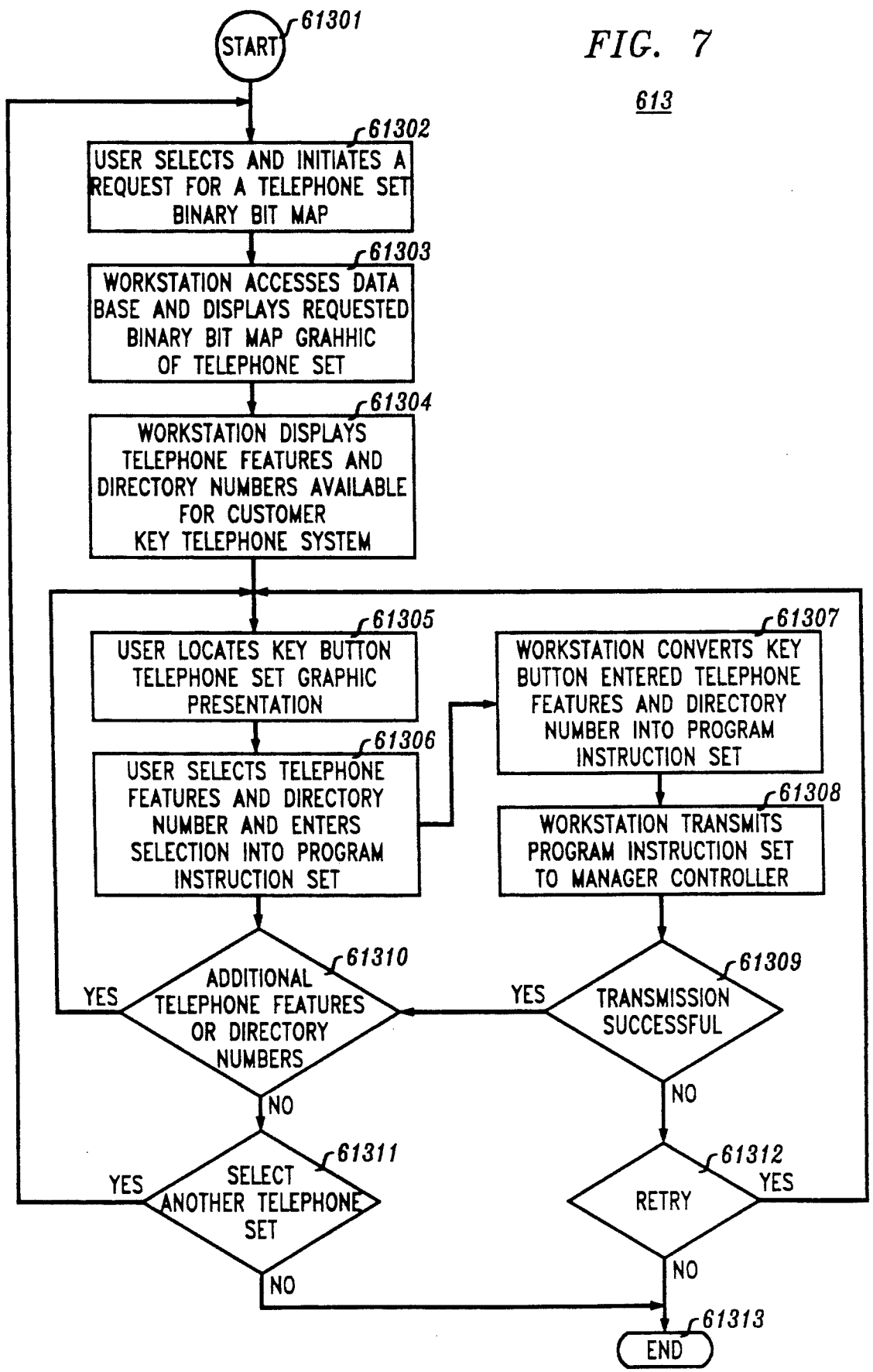

GRAPHICAL USER INTERFACE WORKSTATION

TECHNICAL FIELD

The invention relates to apparatus and method for enabling customers to control and implement telephone line, feature and directory number changes for customer key telephone systems. In particular, the invention relates to a graphical user interface workstation for enabling customers to control and implement the changes on graphical representations of the customer's telephone sets.

BACKGROUND AND PROBLEM

Telephone customers oftentimes have telephone station equipment consisting of telephone sets with ones of the telephone sets connected with multiple telephone lines so that a customer using a telephone set may originate or answer a telephone call on any of the telephone lines. In other telephone set configurations, the customer may want various ones of the telephone lines coupled with all or selected ones of the telephone sets. In addition, the customer may also want telephone lines to be assigned various features available at a telephone switching office serving the customer telephone lines such as call forwarding, call waiting, call transfer, ring selection and others. A customer may also request that various ones of the telephone sets be equipped with key buttons that provide button features such as privacy, speed calling, call hold and others. Such telephone station equipment is sometimes called key telephone systems and a customer key telephone system may comprise a combination of single, six, ten, thirty or more key button telephone sets.

A customer may, from time to time, want to add or remove telephone lines coupled with various telephone sets. In addition, a customer may want to add or delete telephone lines, features and directory numbers to various ones of the telephone sets and to add, delete or rearrange various features associated with each button of the customer's telephone sets. Key telephone management systems are currently available that enable customers to control and implement changes to customer key telephone systems served by a telephone switching system.

The key telephone management system apparatus in interaction with customers enable the customers to select key telephone button and line features and control the telephone switching system to assign the customer selected button and line features to the customer telephone sets.

A problem arises in that a key telephone management system requires that a customer using the system must prepare a set of program instructions that control the operation of the system to implement the customer changes. This requirement makes it necessary that the customer be trained in the operation of program fundamentals in order that the customer can write a set of program instructions required to implement the selected button and line features for each telephone set that is in the customer key telephone system. A need exists for apparatus and a method of operating the apparatus for enabling a customer to implement the changes for each customer telephone set without the need to be trained in a specific program language and without the need for a customer to write a unique set of program instructions to implement a change for each customer telephone set.

SUMMARY OF THE INVENTION

The foregoing problem is solved by a graphical user interface workstation for use in enabling a customer user to implement changes to telephone sets of the customer key telephone systems without the need to be trained in program fundamentals and to write a unique set of program instructions. A single or multiple graphical user interface workstations are interconnected with manager controllers arranged to control telephone switching systems to implement changes to telephone sets of customer key telephone systems served by the telephone switching systems. Each workstation receives and records binary bit map files each embodying a high resolution graphical representation of a telephone set of the customer key telephone systems in a data base file of the workstation. A workstation processor coupled with the data base and which is interactive with a user enables the user to select and display each recorded graphical telephone set representation on a workstation monitor and to selectively enter telephone lines, features and directory number changes onto key button locations of the monitor displayed telephone set representations. The processor converts the user entered key button additions and changes into program instructions and transmits the programs instructions to a remote manager controller for use in controlling a serving telephone switching system to assign the user selected telephone lines, features and directory numbers entered onto the displayed telephone set representations to corresponding telephone sets of a customer key telephone system.

BRIEF DESCRIPTION OF THE DRAWING

FIG. 5 sets forth illustrative sections of programs and data base files recorded in the memory and data base of the graphical user interface workstation set forth in FIG. 1 defining operation of the workstation and graphical representations of customer telephone sets; and FIGS. 6 and 7 illustrate flowcharts of the operation of the graphical user interface workstation set forth in FIGS. 1 through 4 in accordance with the principles of the invention.

DETAILED DESCRIPTION

Figure 1:
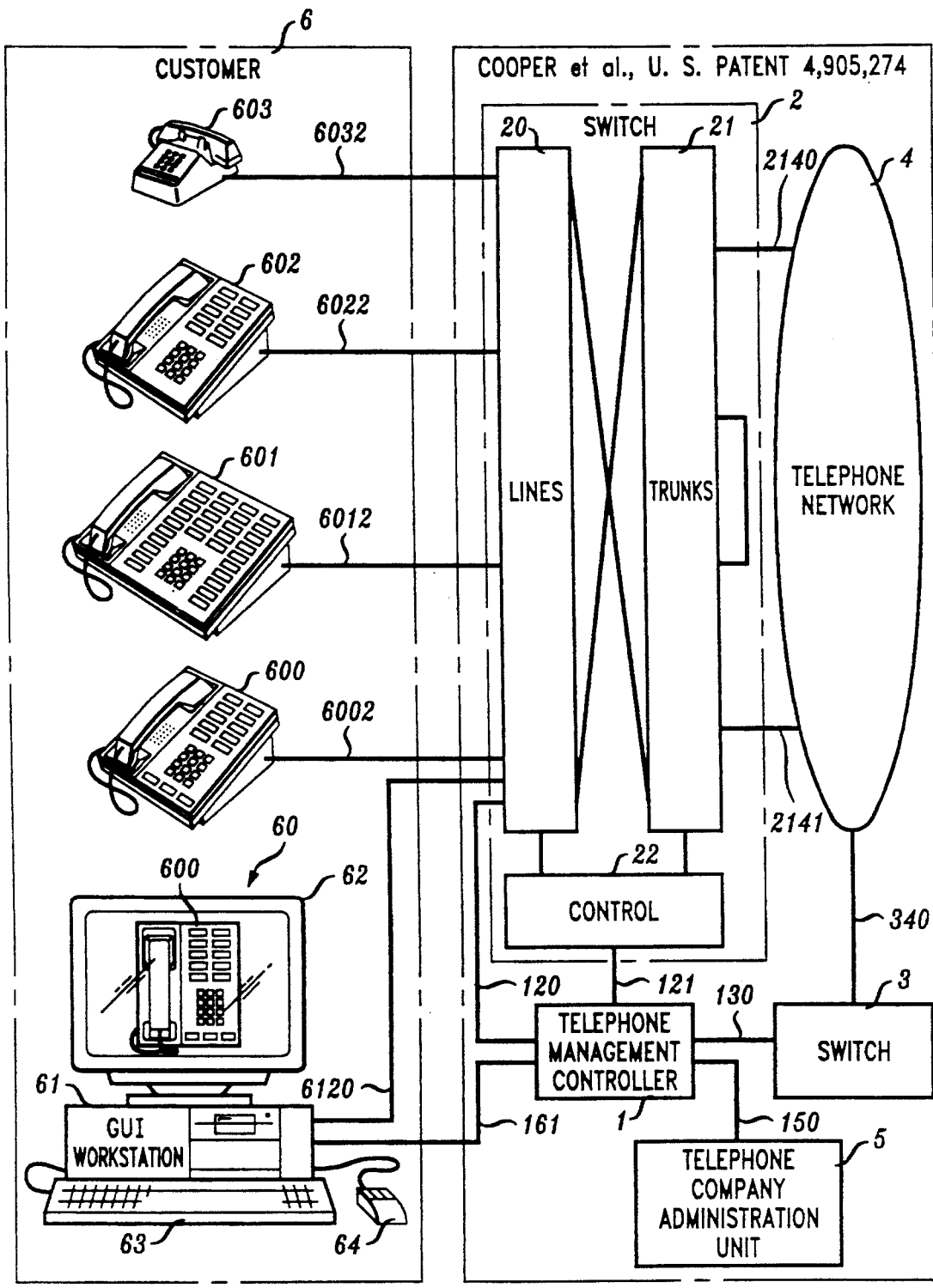
FIG. 1 is a diagram of a key telephone management controlled telephone network interconnected with a graphical user interface workstation embodying the principles of the invention.

In an exemplary embodiment of the invention, key telephone management controller 1, FIG. 1, enables customers, such as customer 6, served by telephone switching systems, such as telephone switching system 2, to control and implement additions and changes to customer key telephone systems served by telephone switching system 2. Telephone switching system 2 may be any of a number of well-known types of telephone switching systems, such as an AT&T 5ESS TM electronic switching system wherein switch code instructions stored in network control 22 enable network control 22 to interconnect line equipment 20 and trunk equipment 21 so as to selectively interconnect customer lines and customer lines with trunks 2140, 2141 of telephone network 4.

Telephone switching system 2 is intended to provide a customer service called Centrex wherein customers, such as customer 6, may subscribe to private branch exchange and key telephone services. In the key telephone service, customer 6 served by telephone switching system 2 may have key telephone systems with each system having multi-button telephone sets coupled with the line and trunk equipment 20, 21 of switching system 2. A typical key telephone system may have various combinations of telephone sets, such as a 13-key button telephone set 600, a 30-key button telephone set 601, a 10-key button telephone set 602 and a 6-key button telephone set 603. A key telephone system may also have a regular telephone set which does not have buttons but which can be provided with certain key telephone system features.

Each customer telephone set of a key telephone system is connected by telephone lines with telephone switching system 2. For example, 13-key button telephone set 600 may be connected by 4 telephone lines, herein represented by telephone line 6002 with line equipment 20 of telephone switching system 2. The 30-key button telephone set 601 may be coupled by 5 telephone lines, herein represented as telephone line 6012, with line equipment 20 and 10-key button telephone set 602 coupled by 3 telephone lines represented as telephone line 6022 with line equipment 20. Similarly, 6-key button telephone set 603 may be coupled by 2 telephone lines, such as telephone line 6032, and a regular telephone set by a single telephone line, with line equipment 20. It is to be understood that although not shown in the drawing, each telephone set with the exception of a regular telephone set, may be coupled by more or less telephone lines with telephone switching system 2 and each telephone line may also be coupled in certain applications with trunk equipment 21.

Telephone switching system 2 is arranged so that various telephone lines, features and directory numbers may be assigned to both customer key telephone sets 600, 601, 602, and 603 and the telephone lines coupled therewith. Some examples of the telephone line features may be a flat rate (FR) and message rate (MR) class of service wherein a customer may elect to lease a telephone line by paying a flat monthly fee or a fee for each call made on the telephone line respectively. A customer may also elect to lease an individual (IL), a party (PR) or a restricted (RL) telephone line. In addition, a customer may, depending upon the type of customer telephone sets, wish to have a ground (GS) or loop (LS) start telephone line. A telephone line serving a customer may also have a call transfer (CT) feature wherein telephone calls may be transferred to other telephone lines and a code calling (CC) telephone line wherein telephone calls may be placed to special telephone numbers on a telephone line having this feature by dialing a special code. Customers may also elect to have a particular telephone line placed on intercept (I) when it is inconvenient to answer telephone calls on the telephone line. In addition, a customer may wish to have a ring selection (RS) feature assigned to various telephone lines, such as having an incoming local telephone call, identified by a single ring and an incoming toll telephone call identified by multiple rings.

Telephone switching system 2 is also arranged to provide customers special key button features wherein a feature may be assigned to a key button of the customer telephone set. For example, a call back (CB) feature may be assigned to a key button of a telephone set so that a customer having dialed a busy telephone number may operate the key button of the telephone set so that subsequent telephone calls may be automatically generated to the busy telephone number. A customer may elect to have interconnect (IC) speed calling (SC) key button features wherein the customer may operate the IC key button to connect to a special telephone line or the SC key button so that by dialing a predetermined abbreviated telephone number the customer can be connected with the telephone set identified by the telephone number. Call hold (CH) and line hold (LH) key button features are available so that a customer may operate a key button of a telephone set to place an incoming telephone call or a telephone line coupled with the telephone set on hold. Conferencing (CO) is available as a key button feature so that a telephone customer may operate a key button so as to conference several telephone lines.

Telephone switching system 2 also provides some features that are common to both telephone lines and key buttons. For example, a route selection (RS) feature may be assigned both to a key button and a telephone line appearing on a telephone set. Operation of the key button assigned the RS feature enables the customer to place telephone calls over the telephone line associated with the RS feature on routes defined by the RS feature. Each telephone line coupled with a telephone set has associated therewith a call pick up (CPU) feature that enables a customer to select the telephone line by operating the key button of the telephone set. Similarly, a telephone set assigned a call forwarding (CF) feature enables a customer to forward a telephone incoming over the telephone line having the CF feature to forward the telephone call to another telephone line. The telephone line call waiting (CW) and privacy (P) features enable a customer to indicate to a called telephone set that a call is waiting and to insure privacy on a telephone call, respectively. These are only some of the features that may be offered to customers. It is to be understood that many additional features could be offered by telephone switching systems, such as telephone switching system 2, within the teaching of the invention.

Figure 2:
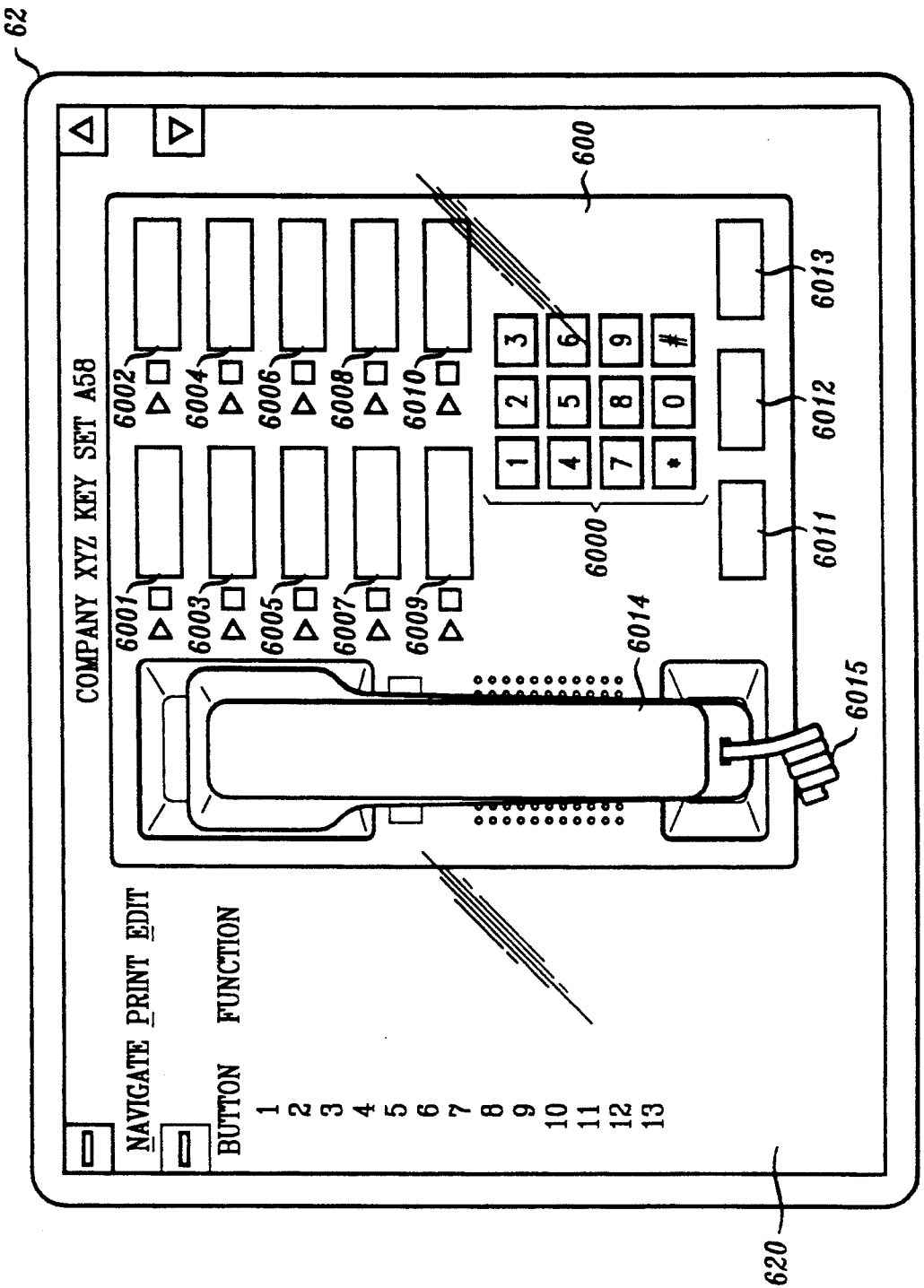
FIGS. 2 and 3 illustrate monitor screen presentations of a customer telephone set and of telephone lines, features and directory numbers selected by a telephone customer for assignment to key button locations of the illustrated key telephone set displayed by the graphical user interface workstation of FIG. 1.

Telephone switching system 2 is coupled by data line 121 with telephone management controller 1 which in turn is coupled by data links 130 with other telephone switching systems 3 and by data link 161 with graphical user interface workstation 60. Telephone management controller 1 is coupled by data link 150 with a telephone company administration unit 5 that owns and administers operation of telephone management controller 1. Telephone management controller 1 is similar to the Key Telephone Manager Controller 1, set forth in U.S. Pat. No. 4,905,274 issued to B. A. Cooper et al. on Feb. 27, 1990, FIG. 2, and need not be described in detail for an understanding of the invention. Sufficient to say, telephone management controller 1, FIG. 1, generates switch messages required to control telephone switching system 2 to implement customer selected telephone line, features and directory numbers for customer telephone sets and transmits the switch messages to telephone switching system 2. Telephone switching system 2 responds to receipt of the switch messages transmitted by telephone management controller 1 by implementing the customer selected telephone line, features and directory numbers for telephone sets of the customer key telephone systems.

Graphical user interface workstation 60, FIG. 1, is located at a customer location 6 and is interconnected by telephone lines 6120 with line equipment 20 of telephone switching system 2 and by a data link 161 with telephone manager controller 1. Workstation 60 is used by the customer for controlling and implementing changes to telephone sets 600, 601, 602, 603 and other telephone sets of the customer key telephone systems served by telephone switching system 2. Workstation 60 basically comprises a processor 61, a keyboard 63 for use in entering information into processor 61 and a monitor 62 for use in displaying high resolution graphical representations of each telephone set of the customer key telephone systems. Processor 61, FIG. 4, may be any of a number of different types of computers, such as a 386, 486 or a type of computer referred to as a general purpose workstation. Such computers need not be described in detail for an understanding of the invention and in general have a central processing unit 6100, a memory unit 6101 and an interface unit 6104 each connected by address, data and control leads to a bus 6103.

Interface unit 6104 of graphical user interface workstation 60 couples monitor 62 and keyboard 63 with bus 6103 so that information may be read from and entered into central processing unit 6100. Workstation 60 is also provided with a data base 6102 which may be recorded on a storage device commonly referred to as a hard disk or any similar type of device used to record data base information. Central processing unit 6100, FIG. 4, receives information from an input device, such as keyboard 63, or information which is transmitted to workstation 60 over data link 161 and telephone line 6120, and records the received information in data base 6102.

In one embodiment of the invention, data base 6102 receives and records a plurality of binary bit map files, FIG. 5, such as binary bit map files 61021 through 61029, each embodying a high resolution graphical representation of a telephone set of the customer key telephone system. Typically, a customer key telephone system may have a wide variety of manufactures' telephone sets each of a different design and configuration. In the instant embodiment of the invention, workstation 60 is assumed to have received and recorded therein a binary bit map file 61021, FIG. 5, embodying a high resolution graphical representation of telephone set 600 identified as a Company XYZ model A58 key telephone set which is a component of the customer key telephone system.

Similarly, data base 6102 receives and records binary bit map files 61022 through 61026 embodying a high resolution graphical representation of customer telephone sets manufactured by AT&T and identified as 10-, 22- and 30-key button model HFA1 and B15 telephone sets. Bit map files 61027 and 61028 are assumed to be high resolution graphical representations of AT&T 1A and 6506 telephone sets and bit map file 61029 is assumed to be a representation of Company Power telephone set model X243.

Figure 4:
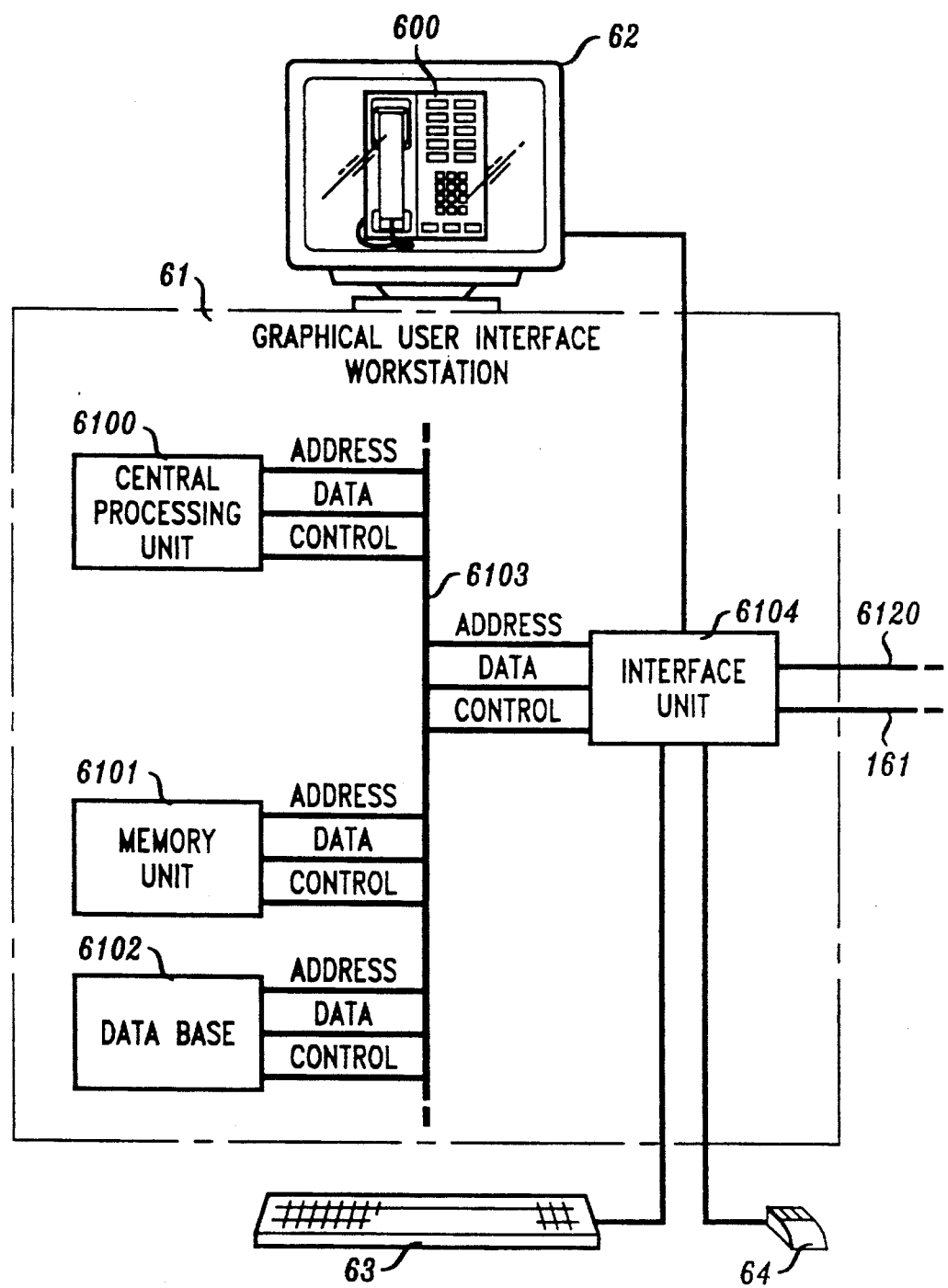
FIG. 4 illustrates the apparatus functional relationship of the graphical user interface workstation set forth in FIG. 1.

Programs 61000, FIG. 5, may be either resident in memory 6101 of central processing unit 6100, FIG. 4, or recorded in data base 6102 and loaded into memory unit 6101. Programs 61000, FIG. 5, may be either UNIX ® programs or other types of operating system programs and control the operation of workstation 60. Application programs are included in programs 61000 and control operation of workstation 60 in accordance with flowcharts set forth in FIGS. 6 and 7.

Workstation 60, FIG. 1, is interactive with a customer user and enables the user to select ones of the binary bit map files, 61021 through 61029, FIG. 4, and display the recorded graphical telephone set representations set forth in the selected binary bit maps. The user selectively enters telephone line, features and directory number changes by keyboard 63, FIG. 1, or by a keyboard in combination with a mouse control 64 onto the graphical telephone set representation displayed on monitor 62. The user keyboard, mouse control or combined keyboard and mouse control entered telephone line, features and directory number changes are converted by programs 61000, FIG. 5, into program instruction set 61020 that are transmitted via interface unit 6104, FIG. 4, over data link 161 or telephone line 6120, FIG. 1, to telephone management controller 1. Telephone management controller 1 transmits switch messages over data link 121 to telephone switching system 2 to control telephone switching system 2 to assign the user selected telephone line, features and directory numbers entered onto the displayed telephone set representation to the corresponding telephone set of the customer key telephone system.

Customer 6, FIG. 1, having subscribed to the services of a key telephone management system, initially contacts a telephone company administration unit 5 and makes arrangements to subscribe to various ones of the above set forth telephone line, features and directory numbers available for the customer key telephone system. Telephone company administration unit 5 prepares telephone management controller 1 to make the customer selected telephone lines, features and directory numbers available to customer 6. A customer 6 user located at workstation 60 initiates operation of the service by establishing a data connection between workstation 60 and telephone management controller 1 either by data link 161 or by telephone lines 6120 and 120 through telephone switching system 2.

Upon establishing the connection, a user loads an application program, such as application program 612, FIG. 5, into memory unit 6101, FIG. 4, to enable processing unit 6100 of workstation 60, FIG. 1, to start a process, step 6121, FIG. 6, for downloading information from telephone management controller 1 identifying the telephone lines, features and directory numbers that are available for use by the customer key telephone system and recording the downloaded information in data base 6102, FIG. 4, of workstation 60. The customer user, hereinafter referred to as user, also requests workstation 60, step 6122, FIG. 6, to initiate a request to telephone management controller 1 for binary bit map files embodying high resolution graphical representations of each telephone set of the customer key telephone systems.

Workstation 60, step 6123, responds to the user request by transmitting the binary bit map file request over the established data line or telephone line connection to telephone management controller 1, FIG. 1. Telephone management controller 1 responds to the workstation request, step 6124, FIG. 6, by transmitting the appropriate binary bit map files to workstation 60. Upon a successful receipt of the binary bit map files, step 6125, workstation 60 records the received binary bit map files in data base 6102, FIG. 4, and ends the information downloading process 612, FIG. 6, steps 6126, 6127. Should there be a transmission failure, step 6125, workstation 60 notifies the user, step 6128, and asks the user if there is to be a retry, step 6129. When the user requests a retry, step 6129, workstation 60 repeats steps 6122 through 6125. Should the user elect not to retry, workstation 60 ends the downloading process, step 6127.

The method of operating workstation 60, FIG. 1, enables a user of workstation 6 to control and implement changes to telephone sets 600, 601, 602 and 603 of a customer's key telephone system served by telephone switching system 2. A user located at workstation 60 commences the process, FIG. 5, represented as an application, such as application 613, by selecting a telephone set of the customer key telephone system, such as telephone set 600, FIG. 1, to change the key button configuration thereof or to add or delete telephone lines, features and directory numbers. Telephone set 600 is assumed to be a 13-key button telephone set manufactured by Company XYZ and is designated as a Key Model A58 telephone set. Binary bit map file 61021, FIG. 5, has been received and recorded in data base 6102, FIG. 4, of workstation 60 along with binary bit map files for all the telephone sets of the customer key telephone system. The user, FIG. 7, step 61302, selects telephone set 600 and initiates a request for binary bit map file 61021, FIG. 4, by entering the identity of telephone set 600 into workstation 60.

Workstation 60, operating in accordance with application program 613, FIG. 5, accesses data base 6102, FIG. 4, and displays recorded binary bit map file 61021, FIG. 5, as a high resolution graphical representation of telephone set 600 on workstation monitor 62. The workstation monitor, FIG. 2, display 620 details telephone set 600 and identifies the manufacture as Company XYZ and the model as Key Set A58. The displayed telephone set 600 has a standard telephone dial section 6000 and a handset 6014 connected by a retractable cord 6015 to the base. Each telephone line, directory number and telephone feature may be assigned to key buttons 6001 through 6010. An arrow indicator located adjacent each key button lights up to indicate the state of the telephone line and feature assigned the key button while a square light indicator shows when the telephone line and feature is in use. Key buttons 6011, 6012 and 6013 located at the bottom of displayed telephone set 600 may be assigned other features available for use by telephone set 600.

Figure 3:
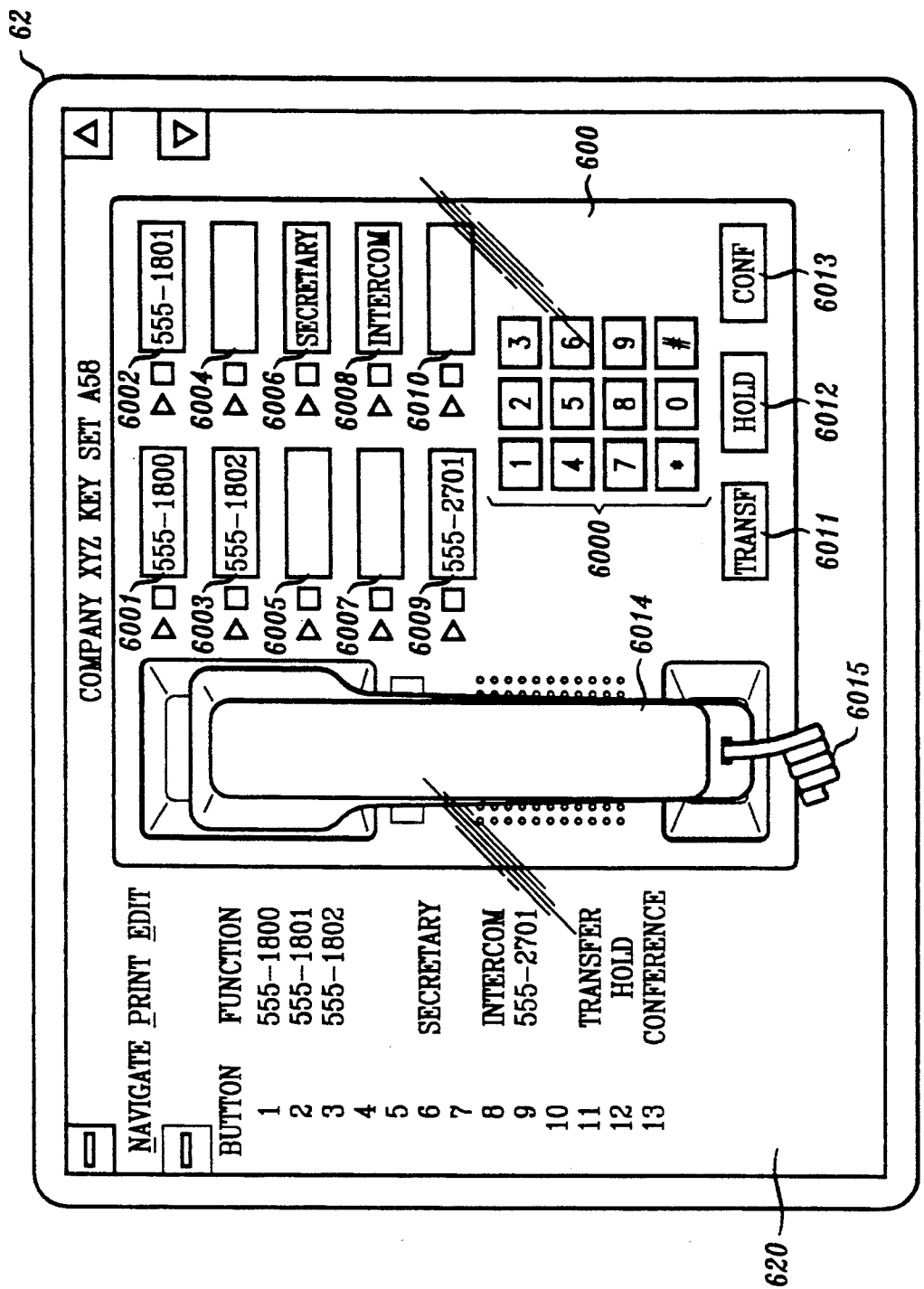

In addition to displaying the telephone sets of the customer key telephone system, FIG. 7, step 61304, workstation 60 also displays the telephone lines, features and directory numbers that are available for use by the customer on each telephone set of a customer key telephone system. In one embodiment of the invention, FIG. 3, the available telephone lines, features and directory numbers may be displayed as a single list figure on the screen of workstation monitor 62. For example, 4 telephone lines and directory numbers 555-1800, 555-1801, 555-1802, 555-2701, line features Secretary and Intercom and features Transfer, Hold and Conference are available for assignment to displayed telephone set 600. In another embodiment of the invention, workstation 60 may display telephone set 600 separate from the displayed list of telephone lines, features and directory numbers or may display telephone set 600 adjacent to the displayed list. In still yet another embodiment of the invention, FIG. 2, a high resolution graphical representation of telephone set 600 may be displayed adjacent a list of the 13-key buttons of telephone set and which may be used to assign ones of the available telephone lines, features and directory numbers to displayed telephone set 600.

The user, FIG. 7, step 61305, locates a key button of either the displayed telephone set 600 or list of the 13-key button list and selects a telephone line, features or directory numbers available for use with the customer key telephone system. The selected telephone line, feature or directory number, step 61306, is entered at the key button location set forth on the displayed representation of telephone set 600. In an embodiment of the invention, the user may use keyboard 63, FIG. 1, coupled with workstation 60 to select a key button location, for example 6001, FIG. 2, on the displayed telephone set 600. Keyboard 63 may also be used to select telephone line and director number 555-1800, FIG. 3, from a displayed list of telephone lines, features and directory numbers and to type the selected telephone line and directory number 555-1800 so as to enter selected telephone line and directory number 555-1800 into workstation 60. The entered telephone line and directory number 555-1800 may be displayed on a list of buttons and functions as set forth in FIG. 3 of the drawing such that key button 6001 is assigned a telephone line and directory number 555-1800. Application program 613, FIG. 5, automatically inscribes the user entered telephone line and directory number 555-1800 into the located key button 6001 location, FIG. 3, of displayed telephone set 600.

In yet another embodiment in accordance with principles of the invention, FIG. 1, workstation 60 may be equipped with a pointing device 64, hereinafter referred to as a "mouse", which is coupled to workstation 60. The user uses the mouse to point to and select a key button location, such as key button 6011, FIG. 2, on displayed telephone set 600. The user is also enabled to select a telephone line, feature or directory number, such as a transfer feature, FIG. 3, from a displayed list of telephone lines, features and directory numbers. The selected transfer feature is assigned to key button of telephone set 600 by pointing to key button location 6011 and operating mouse 64 to enter the selected transfer feature into the selected key button location 6011.

In still yet another embodiment of the invention, workstation 60, FIG. 1, may be provided with mouse 64 and keyboard 63 each coupled with workstation 60. Thus, the user is enabled to use the mouse to point to and select a key button location such as 6008, FIG. 3, on displayed telephone set 600. The user then types via keyboard 63, a selected telephone line, feature or directory number, such as Intercom into selected key button location 6008 so that telephone set 600 has an Intercom line assigned to key button 6008. Similarly, other telephone lines, features and director numbers 555-1801, 555-1802, 555-2701, Secretary Hold and Conference may be assigned by the user to key buttons 6002, 6003, 6009, 6006, 6012, 6013, respectively, by use of keyboard 63, mouse 64 or the combination thereof.

After the changes, additions and deletions have been entered into displayed telephone set 600, workstation 60, operating in accordance with application program instructions, FIG. 7, step 61307, converts the selected telephone line, features and directory numbers entered into key button locations 6001 through 6013 of displayed telephone set 600 into a program instruction set 61020, FIG. 5, for controlling operation of telephone manager controller 1, FIG. 1. Specifically, workstation 60 obtains information entered into the graphical display of telephone set 600 and adds other information from data base 6102, FIG. 4, that may be required in addition to the user entered graphical display information. Workstation 60 then assembles the graphical display and data base information and converts assembled information into program instruction set 61020, FIG. 5.

Workstation 60, FIG. 1, then establishes a connection via data link 161 or telephone connection through telephone lines 6120, 120 and telephone switching system 2 with telephone management controller 1. Program instruction set 61020, FIG. 5, is transmitted over the established connection to telephone manager controller 1, FIG. 7, step 61308, for use in controlling telephone switching system 2, FIG. 1, to assign the user key button entered telephone line, features and directory numbers to telephone set 600 represented by the telephone set representation displayed on workstation monitor 62.

When the transmission sequence is successful, FIG. 7, step 61309, workstation 60 queries the user if addition or other telephone line, feature and directory numbers changes, additions or deletions are to be made to displayed telephone set 600, step 61310. Should the user indicate that more changes, additions or deletions are required, workstation 60 repeats steps 61305 through 61309. When the user is finished with telephone set 600, step 61311, workstation 60 asks the user if the user wants to select another telephone set of the customer key telephone system. If there are changes, additions or deletions to be made to other telephone sets, step 61311, workstation 60 repeats steps 61302 through 61311 until all of the user selected telephone sets have been modified, step 61311, at which time the process is ended, step 61313. When the transmission of a program instruction set 61020, FIG. 5, to telephone management controller 1 is unsuccessful, FIG. 7, step 61309, workstation 60 asks the user if a retry is required, step 61312. When a retry is required, workstation 60 repeats process steps 61305 through 61309. If the user does not request a retry, the process is ended, steps 61312, 61313.

Thus, workstation 60 is interactive with a customer user and enables the user to select and display graphical high resolutions of each telephone set of a customer key telephone system. A user selectively enters telephone line, features and directory numbers onto the workstation monitor displayed telephone set to assign the entered telephone line, features and directory numbers to key buttons of the displayed telephone set. The user entered changes, additions and deletions are converted into program instruction sets and transmitted to a telephone company manager controller for use in controlling a telephone switching system serving the customer to assign the user selected telephone lines, features and directory numbers to telephone sets corresponding with the workstations displayed telephone sets of the customer key telephone system 2.

We claim:

1. A graphical user interface workstation interconnected with a manager controller for controlling and implementing the assignment of changes to telephone sets of customer key telephone systems served by a telephone switching system wherein said graphical user interface workstation comprises means for recording graphical representations of each telephone set of a customer key telephone system, and means coupled with said recording means and interactive with a user for selecting and displaying ones of the recorded graphical telephone set representations and for enabling the user to selectively enter changes of telephone parameters controllable by said telephone switching system onto said displayed recorded graphical telephone set representations and convert the entered changes of the telephone parameters into program instructions transmitted to the manager controller for use in controlling the telephone switching system to assign the selected telephone parameter changes entered onto the displayed telephone set representations to corresponding telephone sets of the customer key telephone system.

2. The graphical user interface workstation set forth in claim 1 wherein said recording means comprises means for receiving and recording a plurality of binary bit map files each embodying a high resolution graphical representation of a telephone set of the customer key telephone system.

3. The graphical user interface workstation set forth in claim 2 wherein said selecting, displaying and enabling means comprises means interactive with the user and coupled with said recording means for enabling the user to select and display one of said recorded binary bit map files corresponding with a telephone set of the customer key telephone system.

4. The graphical user interface workstation set forth in claim 1 wherein said selecting, displaying and enabling means comprises means for enabling the user to select telephone parameters available for use with the customer key telephone system and to selectively enter the selected telephone parameters at key button locations set forth on the displayed telephone set representation.

5. The graphical user interface workstation set forth in claim 4 wherein said selecting, displaying and enabling means comprises means for converting the selected telephone parameters entered by the user onto the key buttons of the displayed telephone set representation into a set of program instructions required for controlling operation of the manager controller.

6. The graphical user interface workstation set forth in claim 5 wherein said selecting, displaying and enabling means comprises means responsive to said converting means and interconnecting said workstation graphical user interface with the manager controller for transmitting said program instructions set to the manager controller for use in controlling the telephone switching system to assign the user entered key button telephone parameters to the telephone set represented by the displayed telephone set representation.

7. The graphical user interface workstation set forth in claim 4 wherein said enabling and selectively entering means comprises input means for enabling the user to select a key button location on the displayed telephone set representation and enter a selected telephone parameter into the selected key button location.

8. The graphical user interface workstation set forth in claim 7 wherein said input means comprises a keyboard coupled with the workstation for selecting the key button location on the displayed telephone set representation and a telephone parameter from a displayed list of telephone parameters available for use with the customer key telephone system and for enabling the user to enter the selected telephone parameter into the selected key button location.

9. The graphical user interface workstation set forth in claim 7 wherein said input means comprises a pointing device coupled with the workstation for selecting the key button location on the displayed telephone set representation and a telephone parameter from a displayed list of telephone parameters available for use with the customer key telephone system and for enabling the user to enter the selected telephone parameter into the selected key button location.

10. The graphical user interface workstation set forth in claim 7 wherein said input means comprises a pointing device and a keyboard device each coupled with the workstation for enabling the user to point to and select the key button location on the displayed telephone set representation and for enabling the user to type a selected telephone parameter into the selected key button location.

11. A graphical user interface workstation interconnected with a manager controller for controlling and implementing the assignment of changes to telephone sets of customer key telephone systems served by a telephone switching system wherein said workstation graphical user interface comprises a data base for receiving and recording high resolution graphical representations of each telephone set of a customer key telephone system, and a processor coupled with said data base and interactive with a user for selecting and displaying ones of the recorded graphical telephone set representations and for enabling the user to selectively enter telephone line, features and directory numbers onto said displayed telephone recorded graphical set representations and convert the entered telephone lines, features and directory numbers into program instructions transmitted to the manager controller for use in controlling the telephone switching system to assign the user selected telephone lines, features an directory numbers to corresponding telephone sets of the customer key telephone system.

12. The graphical user interface workstation set forth in claim 11 wherein said processor means comprises input means connected with said processor for enabling the user of the workstation to select and display one of the recorded graphical telephone set representations and to identify a key button on said displayed telephone set representation and to enter a selected one of said telephone lines, features and directory numbers onto the identified key button location.

13. The graphical user interface workstation set forth in claim 12 wherein said input means comprises a keyboard device coupled with said processor for identifying the key button location on the displayed telephone recorded graphical set representation and for selecting a telephone line, feature and directory number from a displayed list of telephone features and directory numbers available for use with the customer key telephone system and for enabling the user to type the selected telephone line, feature and directory number into the identified key button location on the displayed telephone set representation.

14. The graphical user interface workstation set forth in claim 12 wherein said input means comprises a mouse device coupled with said processor for enabling the user to point to a key button location on the displayed telephone recorded graphical set representation and to select a telephone line, feature and directory number from a displayed list of telephone lines, features and directory numbers available for use with the customer key telephone system and enter the selected telephone line, feature and directory number into the key button location.

15. The graphical user interface workstation set forth in claim 12 wherein said input means comprises a mouse device and a keyboard device coupled with said processor for enabling the user to point to and select the key button location on the displayed recorded graphical telephone set representation and for enabling the user to type a selected telephone line, feature and directory number into the selected key button location.

16. A graphical user interface workstation interconnected with a telephone manager controller for controlling and implementing the assignment of changes to telephone sets of customer key telephone systems served by a telephone switching system wherein said workstation comprises a data base for receiving and recording a plurality of binary bit map files each embodying a high resolution graphical representation of one of the telephone sets of a customer key telephone system, means interactive with the user and coupled with said data base for enabling the user to select and display one of said recorded binary bit map files corresponding to a telephone set of the customer key telephone system, means for enabling the user to select a telephone line, feature and directory number available for use with the customer key telephone system and for enabling the user to select a key button location on the high resolution graphical telephone set representation and enter said selected telephone line, feature and directory number into the selected key button location, means for converting the entered key button telephone line, feature and directory number into a set of program instructions for controlling operation of the telephone manager controller, and means responsive to said converting means and interconnecting said workstation with the telephone manager controller for transmitting said program instructions set to the telephone manager controller for use in controlling the telephone switching system to assign the user entered key button telephone line, feature and directory number to the telephone set corresponding to the high resolution graphical telephone set representation.

17. A method of operating a graphical user interface workstation interconnected with a manager controller to control and implement the assignment of changes to telephone sets of customer key telephone systems served by a telephone switching system wherein said method comprises the steps of selecting and displaying on a monitor of the workstation a high resolution graphical representation of a telephone set of a customer key telephone system recorded in a data base of the workstation, and selectively entering changes of telephone parameters controllable by said telephone switching system into key button locations of the high resolution graphical telephone set representation and converting the entered key button changes into program instructions transmitted to the manager controller for controlling the telephone switching system to assign the user selected telephone parameters entered onto the high resolution graphical telephone set representation to a corresponding telephone set of the customer key telephone system.

18. The graphical user interface workstation operating method set forth in claim 17 wherein said selecting and displaying step comprises the step of recording a plurality of binary bit map files each embodying a high resolution graphical representation of a telephone set of the customer key telephone system within the data base.

19. The graphical user interface workstation operating method set forth in claim 18 wherein said selecting and displaying steps comprise the step of enabling a user to select and display one of said recorded binary bit map files corresponding to the telephone set of the customer key telephone system on the workstation monitor.

20. The graphical user interface workstation operating method set forth in claim 19 wherein said selectively entering and converting step comprises the step of selecting ones of telephone lines, features and directory numbers available for use with the customer key telephone system and entering the selected telephone lines, features and directory numbers at key button locations set forth on the high resolution graphical telephone set representation.

21. The graphical user interface workstation operating method set forth in claim 20 wherein said selectively entering and converting step comprises the step of converting the selected telephone lines, features and directory numbers entered into the key button locations of the high resolution graphical telephone set representation into a set of program instructions for controlling operation of the manager controller.

22. The graphical user interface workstation operating method set forth in claim 21 wherein said selectively entering and converting step comprises the step of transmitting said program instructions set to the manager controller to control the telephone switching system to assign the entered key button telephone lines, features and directory numbers to the telephone set represented by the high resolution graphical telephone set representation.

23. A method of operating a graphical user interface workstation interconnected with a manager controller to control and implement the assignment of changes to telephone sets of customer key telephone systems served by a telephone switching system wherein said method comprises the steps of:

recording a plurality of binary bit map files each embodying a high resolution graphical representation of a telephone set of the customer key telephone system, selecting and displaying one of said recorded binary bit map files corresponding to one of the telephone sets of the customer key telephone system on a monitor of the workstation, locating a key button on the displayed telephone set representation and selecting a telephone parameter controllable by said telephone switching system from a plurality of telephone parameters available for use with the customer key telephone system, entering the selected telephone parameter at the key button location set forth on the high resolution graphical telephone set representation, converting the entered telephone parameter into a set of program instructions for controlling operation of the manager controller, and transmitting said program instructions set to the manager controller to control the telephone switching system to assign the entered key button telephone parameter to the one telephone set corresponding to the high resolution graphical telephone set representation.

* * * * *

UNITED STATES PATENT AND TRADEMARK OFFICE
CERTIFICATE OF CORRECTION

PATENT NO. : 5,309,509
DATED : May 3, 1994
INVENTOR(S) : S. L. Cocklin, T. P. Orlofsky, T. T. van der Heyde It is certified that error appears in the above—identified patent and that said Letters Patent is hereby corrected as shown below:

IN THE CLAIMS

Column 10, line 54, preceding "workstation" insert --graphical user interface--.
Column 11, line 33, preceding "workstation" insert -- graphical user interface--.
Column 11, line 43, preceding "telephone" insert --recorded graphical--.
Column 11, line 66, preceding "telephone" insert --recorded graphical--.
Column 12, line 11, preceding "telephone" insert --recorded graphical--.

Signed and Sealed this

Thirty-first Day of January, 1995

Attest:

BRUCE LEHMAN

Attesting Officer          Commissioner of Patents and Trademarks